Apr. 3, 1923.

M. S. LONGNAKER

Re. 15,571

EXCAVATING MACHINE

Original Filed Apr. 5, 1907

3 sheets-sheet 1

Inventor.
Milton S. Longnaker,
By Dyrenforth, Lee, Christon & Wilks,
Att'ys.

Apr. 3, 1923. Re. 15,571

M. S. LONGNAKER

EXCAVATING MACHINE

Original Filed Apr. 5, 1907 3 sheets-sheet 2

Inventor:
Milton S. Longnaker,
By Dyrenforth, Lee, Christy & Miles,
Att'ys.

Apr. 3, 1923. Re. 15,571
M. S. LONGNAKER
EXCAVATING MACHINE
Original Filed Apr. 5, 1907 3 sheets-sheet 3
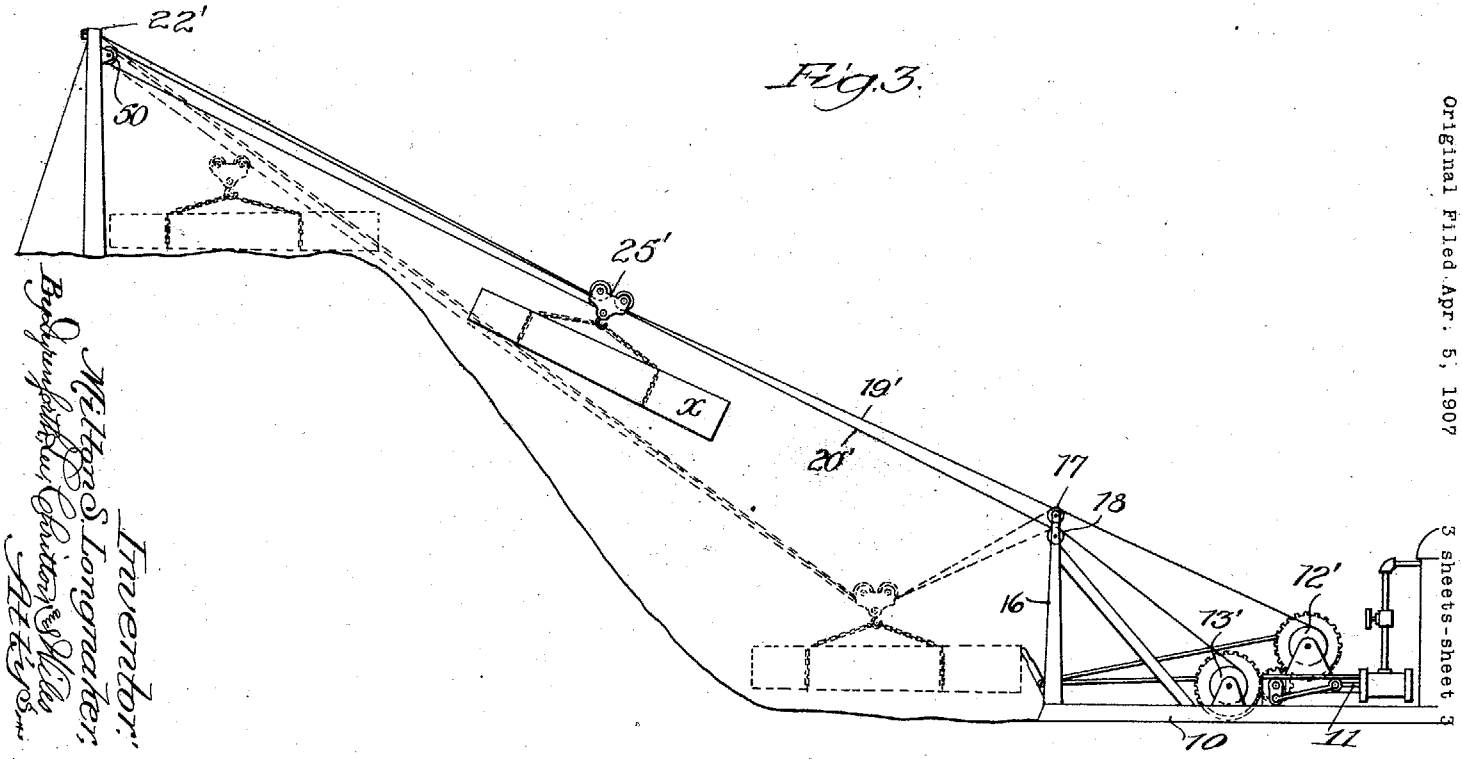
Inventor:
Milton S. Longnaker,
By Dyrenforth, Lee, Christy & Wiles
Atty's.

Reissued Apr. 3, 1923.

Re. 15,571

UNITED STATES PATENT OFFICE.

MILTON S. LONGNAKER, OF PLEASANT HILL, OHIO, ASSIGNOR, BY MESNE ASSIGNMENTS, TO JOHN W. PAGE, OF CHICAGO, ILLINOIS.

EXCAVATING MACHINE.

Original No. 877,578, dated January 28, 1908, Serial No. 366,615, filed April 5, 1907. Application for reissue filed January 24, 1922. Serial No. 531,461.

*To all whom it may concern:*

Be it known that I, MILTON S. LONGNAKER, a citizen of the United States, residing at Pleasant Hill, in the county of Miami and State of Ohio, have invented a new and useful Excavating Machine, of which the following is a specification.

This invention relates to excavating machines, and has for its principal object to provide a mechanism of very simple construction for excavating trenches, railroad cuts, or for use in other work, the mechanism being so arranged that both the digging and dumping operations are under the control of a single operator.

A further object of the invention is to provide a mechanism of this class in which the excavator bucket or shovel is suspended from an aerial cable which may be readily adjusted for the purpose of altering the digging point, and which may be inclined to a greater or less extent to permit the running of the filled scoop or bucket to the dumping point.

A still further object of the invention is to provide a mechanism of this class in which the bucket operating cable forms the sole means for supporting the bucket in both digging and conveying position, slackening of the cable permitting the bucket to move to dumping position so that the bucket may be allowed to run any desired distance while the operating cable is held taut, and on slackening such cable the contents of the bucket may be dumped.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 1:
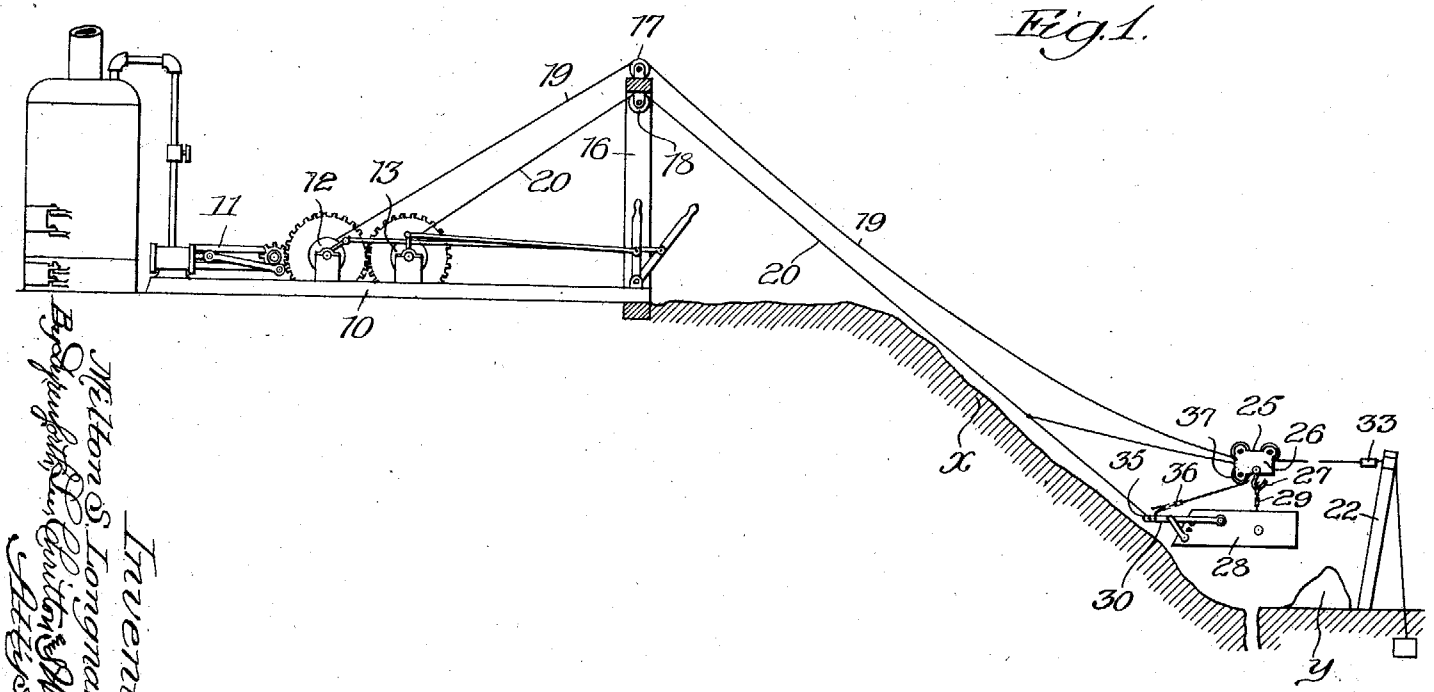
Figure 2:
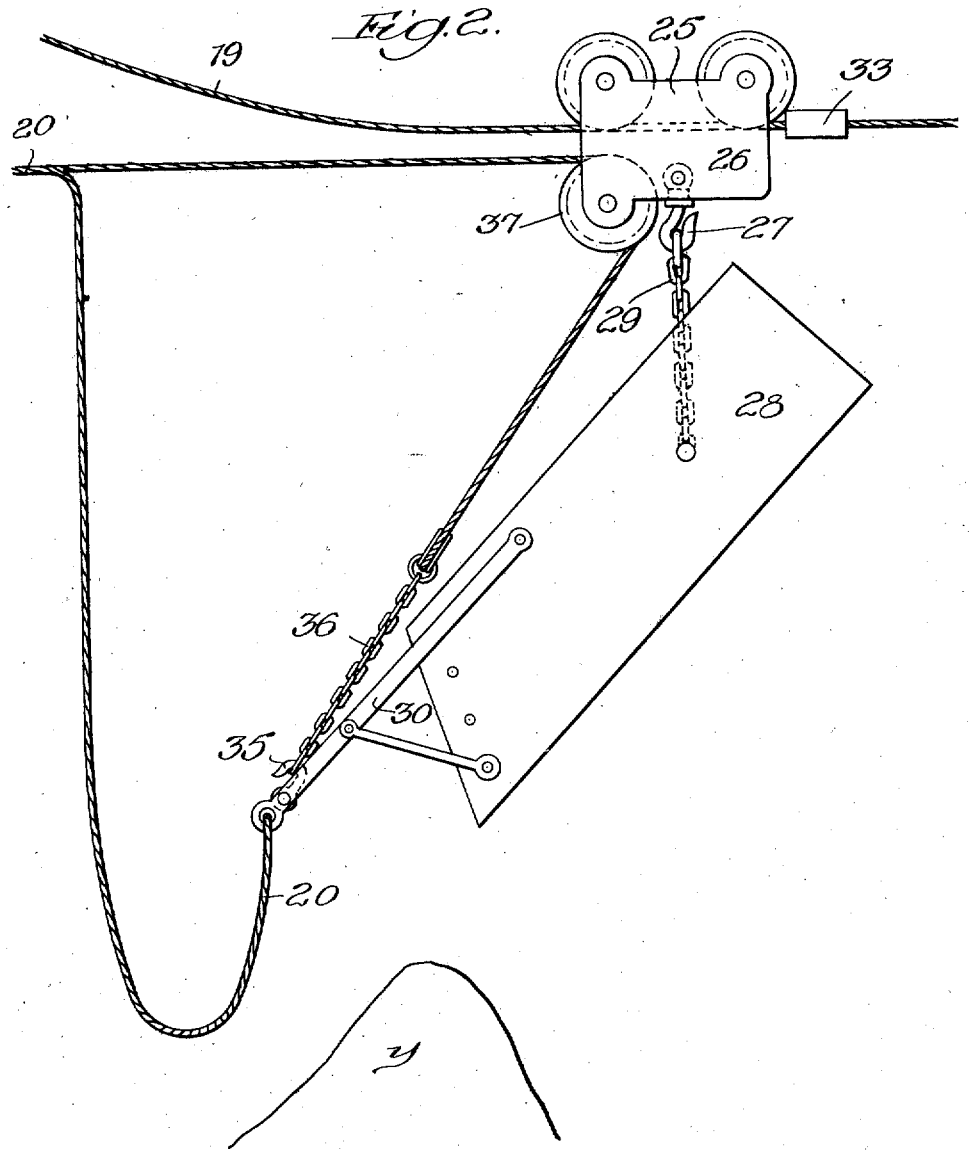

In the accompanying drawings:—Figure 1 is an elevation of an excavating mechanism constructed in accordance with the invention. Fig. 2 is a detail view of the carrier and scoop, the latter being shown in its dumping position. Fig. 3 is an elevation illustrating a modification of the invention.

Similar numerals of reference are employed to indicate corresponding parts throughout the several figures of the drawings.

The mechanism as shown in Figs. 1 and 2 of the drawing is designed for digging gravel or other material from a bank $x$, and conveying the same to a dumping point $y$, and the mechanism is, therefore, arranged transversely with respect to the cut, or in case of trench work, as in excavating for sewers, or canal work, the mechanism may be arranged in the direction of the length of the cut, and provision made for deflecting the cable in order to dump the material at one or other side of the trench.

The operating mechanism is mounted on a suitable frame 10, and includes an engine 11 and a pair of winding drums 12 and 13, these drums being independently connected to the engine, and suitable clutching and braking mechanism of any ordinary type being employed to permit independent operation of said drums. In front of the drum is arranged a derrick 16, at the top of which are two sheaves 17 and 18, over which are guided cables 19 and 20, respectively, the cable 19 running to the winding drum 12, and the cable 20 to the drum 13.

At some distance beyond the dumping point $y$ is a suitable anchor 22, to which the end of the cable 19 is firmly secured, and this cable may be stretched more or less taut, by the winding drum, so that the cable may be presented at any desired angle.

Mounted on the cable 19 is a wheeled carrier 25, said carrier including a suitable frame 26 that depends below the line of the cable, and is provided with a hook or eye 27, from which is suspended an excavating scoop or bucket 28, preferably by means of flexible connections, such as chains 29, and the point of connection of the chains with the scoop or bucket is to the rear of the vertical plane of the center of gravity of the bucket when in a horizontal position, so that if the forward end of the bucket is left free, it will descend and allow the contents of the bucket to discharge by gravity.

Extending forward from the side plates of the scoop is a pair of arms 30, and to the forward ends of these arms is connected an operating cable 20, said cable serving as a means for pulling the scoop from the dumping to the digging position for accomplishing the digging operation, that is to say, dragging the scoop into or through the material being excavated, and checking the return movement of the scoop along the cable 19 as the scoop travels by gravity toward the dumping point, this dumping point being determined by a stop block 33 which may be clamped on the cable 19 at any desired point, and which serves by engagement with the frame 26 to stop the movement of the scoop carrier.

At the forward ends of the arms 30 is a hook 35 engaging one link of a chain 36 that extends over a guiding sheave 37 carried by the frame 26, the chain being extended forward and connected to the cable 20 and when this chain is drawn up, the scoop is maintained in a horizontal or approximately horizontal position the exact angle being adjusted by placing one or more of the links of the chain over the hook 35, so that the digging edge may be properly presented to the material to be excavated.

In operation, the cable 19 is first adjusted by winding on the drum 12, and then the drum 13 is started into motion, winding up the cable 20 and drawing the scoop along until it engages with the material to be excavated. The scoop is pulled into the material until filled, and then the cable is slacked, gradually allowing the scoop to travel by gravity toward the dumping point *y*, the cable 20 being meantime retained sufficiently taut to prevent the scoop from moving to dumping position. When the frame 26 strikes the stop block, the cable 20 is slackened, and as the chain 36 becomes slack, the scoop is overbalanced, and its forward end drops, allowing the contents to discharge by gravity at the point *y*. The drum 13 is again started into motion, the first effect of pulling on the cable 20 being to again restore the scoop to the digging position after which the scoop is pulled along to receive another load. In trench work the anchor may be slightly deflected to one or other side of the trench for the purpose of dumping the dirt, or a suitable cable or guy may be connected to the cable 19 at any point between the anchor and the stop block for the purpose of deflecting the line of supporting cable and permit dumping into wagons, or any point alongside of the trench.

The foregoing description applies particularly to the use of the apparatus as a conveyer and excavator in making cuts and in digging canals, trenches, and so forth, but it will be understood that other load holders or carriers than the scoop can be employed when it is desired to handle logs, stone, and so forth, and that the entire apparatus may be reversed when, for instance, it is desired to dump the excavations on the top of the bank, or on the elevation, the engine and operating means being located in the cut.

In the arrangement shown in Fig. 3, the apparatus may be used for the raising of any material or articles from the bottom of the trench to an elevation. In this case the upper end of the supporting cable 19′ is firmly secured to the mast or post 22′, and the opposite end of said cable extends around a winding drum 12′, so that the cable may be drawn taut or may be allowed to slacken for the purpose of receiving or delivering the load. The operating cable 20′ is wound at one end on the drum 13′ and thence extends over a guiding sheave 50 carried by the mast 22′, the end of the cable being thence connected to a carriage 25′, which in the present instance is shown as supporting a log or other load *x*, although it may be attached to the excavating machine, if desired. If the load is at the bottom of the ditch, the cables are slackened until the carriage lowers to an extent sufficient to permit detaching the load, after which the cables are drawn taut, and then on further stress on the operating cable, the load is carried up to the top of the bank or other point, where it is to be delivered. The carriage runs back to the starting point by gravity.

I claim:

1. In apparatus of the class described, an inclined cable or support, means for slackening and drawing the cable taut to alter its degree of inclination, a movable carriage arranged to travel on the inclined cable and movable thereon in one direction by gravity, a pivotally hung load conveying device suspended from said carriage for free pivotal movement, and an operating cable connected to said conveying device and arranged to haul the same in the opposite direction.

2. In an excavating machine, an inclined cable, a wheeled frame arranged to travel on said cable by gravity from excavating to dumping position, a scoop pivotally suspended from said frame, an operating cable connected to the scoop and tending to move the same from dumping to excavating position, and a loop extending from the cable over a portion of the frame to said scoop, and being adjustably connected to the latter, the loop extending to maintain the scoop in digging and dirt conveying position when the operating cable is taut.

3. In an excavating machine, an inclined cable, a wheeled frame free to travel thereon and provided with an auxiliary guiding sheave below the cable, a pivotally mounted digging scoop hung from the frame and tending to move to dumping position by gravity, an operating cable connected to the forward end of the scoop, and an auxiliary loop extending from the cable over the auxiliary sheave and connected to the forward end of the scoop to maintain the latter in digging and conveying position while the operating cable is taut.

4. In an excavating machine, an inclined supporting cable, a wheeled frame mounted thereon, a digging scoop pivotally hung from the frame, an operating cable for the scoop, and means for adjusting the inclination of the supporting cable to vary the digging point of said scoop.

MILTON S. LONGNAKER.